United States Patent [19]
Milner et al.

[11] 3,798,026
[45] Mar. 19, 1974

[54] COPPER HYDROMETALLURGY

[75] Inventors: Edward Francis Godfrey Milner, Trail, British Columbia; Ernest Peters, Vancouver, British Columbia; Godefridus Maria Swinkels, Rossland, British Columbia; Andrew Imre Vizsolyi, Vancouver, British Columbia, all of Canada

[73] Assignee: Cominco Ltd., Vancouver, British Columbia, Canada

[22] Filed: Mar. 27, 1972

[21] Appl. No.: 238,460

[52] U.S. Cl.................. 75/104, 75/117, 75/109, 423/27, 423/38, 423/34, 423/140, 423/150
[51] Int. Cl............................................... C22b 3/00
[58] Field of Search.......... 75/101 R, 104, 114, 117, 75/109; 423/27, 38, 567, 140, 150

[56] References Cited
UNITED STATES PATENTS

| | | | |
|---|---|---|---|
| 1,230,078 | 6/1917 | Slater | 423/27 |
| 1,943,332 | 1/1934 | Mitchell | 75/104 |
| 3,661,563 | 5/1972 | Spedden et al. | 75/101 R |

*Primary Examiner*—Herbert T. Carter

[57] ABSTRACT

A cyclic method of recovering copper, iron and sulfur from iron and copper sulfide bearing materials is described. The method is self-sufficient with regard to iron and copper consumption and gives almost quantitative yields of iron and copper. The method comprises:

1. subjecting a copper bearing material to a leach with a hot ferric chloride containing lixiviant,
2. separating the reaction mixture thereby formed into a solids residue and a leach solution containing cuprous, cupric and ferrous chlorides,
3. adding metallic copper to said leach solution to thereby reduce cupric ions present to the cuprous state,
4. crystallizing out cuprous chloride formed in step (3) above,
5. treating the cuprous chloride with hydrogen to form elemental copper and hydrogen chloride gas, and,
6. treating the ferrours chloride with hydrochloric acid and oxygen to regenerate the ferric chloride containing lixiviant and to simultaneously precipitate ferric oxide.

The ferric chloride containing lixiviant is recycled to the leaching step. The ferric oxide is reduced to elemental iron.

34 Claims, 1 Drawing Figure

3,798,026

COPPER HYDROMETALLURGY

BACKGROUND OF THE INVENTION

1. Field of Invention

This invention relates to the recovery of copper values from copper bearing materials. More particularly it relates to a method of leaching copper and sulfur from copper sulfide and copper iron sulfide ore concentrates with ferric chloride; said method including the steps of regenerating and recycling ferric chloride and recovering iron.

2. Description of Prior Art

One method previously disclosed comprised leaching pulverized copper and iron sulfide ores or concentrates with an excess of boiling ferrous ferric chloride solution to form cuprous chloride and elemental sulfur. Excess ferric content was reduced by adding pyrrhotite whereby also cuprous sulfide and silver sulfide were precipitated. The precipitation was completed under pressure and with intermediate roasting steps. Elemental sulfur was distilled from the precipitate and the residue treated to recover copper and precious metal values. The final solution was electrolyzed for the recovery of elemental iron and regeneration of leach solution. Because of this last step the process can only be carried out economically in areas where there is an inexpensive source of electrical power.

The method according to the present invention has a number of important advantages.

The method is a closed cycle hydrometallurgical process from which metallic copper, metallic iron and elemental sulfur are recovered as high quality products.

Metallic copper, metallic iron and elemental sulfur are separately and almost quantitatively recovered from the feed. Certain valuable metals such as molybdenum and gold are recovered in a concentrated form which is amenable to further processing for separate recovery of these metals.

The closed cycle method is self-sufficient with regard to its consumption of copper and iron and the ferric chloride lixiviant. Besides copper bearing material, only oxygen and hydrogen are required by the process.

A variety of copper bearing materials can be directly treated without any preliminary or intermediate pyrometallurgical treatment.

Except for small amounts of solids such as flotation tailings, which can be used for refill in mined-out areas, the process does not generate fluid waste streams which might upset the balance of nature.

In most stages of the method concentrated solutions are used with limits the size and cost of equipment.

SUMMARY OF THE INVENTION

The method according to this invention comprises:
1. subjecting a copper bearing material to a leach with a hot ferric chloride containing lixiviant,
2. separating the reaction mixture thereby formed into a solids residue and a leach solution containing cuprous, cupric and ferrous chlorides,
3. adding metallic copper to said leach solution to thereby reduce cupric ions present to the cuprous state,
4. crystallizing out cuprous chloride formed in step (3) above,
5. treating the cuprous chloride with hydrogen to form elemental copper and hydrogen chloride gas, and,
6. treating the ferrous chloride with hydrochloric acid and oxygen to regenerate the ferric chloride containing lixiviant and to simultaneously precipitate ferric oxide.

In a further embodiment of the invention the mother liquor from step (4) above is treated with metallic iron to precipitate copper and leave a residual solution containing dissolved iron prior to the regeneration. This residual solution is then treated with hydrochloric acid and oxygen so that a predetermined amount of ferric chloride is regenerated. This ferric chloride is recycled to the leaching step. The remaining iron values in the residual solution are concurrently with the regeneration of ferric chloride, precipitated as ferric oxide. The ferric oxide is finally reduced to elemental iron.

In yet a further embodiment of the invention, when the solid residues of step (1) above contain sulfur both in elemental and sulfide form, they are treated by flotation to recover elemental sulfur and metal sulfides. The sulfides are further treated to recover metal values.

BRIEF DESCRIPTION OF THE DRAWING

The invention may be more fully understood by having reference to the attached drawing which is a flowsheet diagrammatically representing the method of the invention.

DETAILED DESCRIPTION OF PREFERRED EMBODIMENTS

In the process according to the invention copper bearing materials such as copper concentrates, copper bearing mineral mixtures, impure metallic copper and copper matte are treated to produce a high grade metallic copper.

For example, the copper bearing concentrates are obtained from copper bearing ore which has been processed according to well-known methods, whereby the bulk of the undesirable gangue materials has been removed. The minerals present in the copper concentrates comprise copper-iron sulfides such as chalcopyrite and bornite, copper sulfides such as covellite, diginite and chalcocite, as well as sulfides of other base metals such as iron, nickel, cobalt, tin, molybdenum, lead, bismuth and zinc, and precious metals such as silver and gold.

Usually, the above mentioned copper bearing materials are in a finely divided form and can be treated directly in the process without a preliminary size reduction step. However, the copper bearing materials may be subjected to a size reduction to improve the copper extraction and the leaching rate. This size reduction is usually accomplished by grinding and may be performed either dry or in an aqueous slurry.

Figure 1:
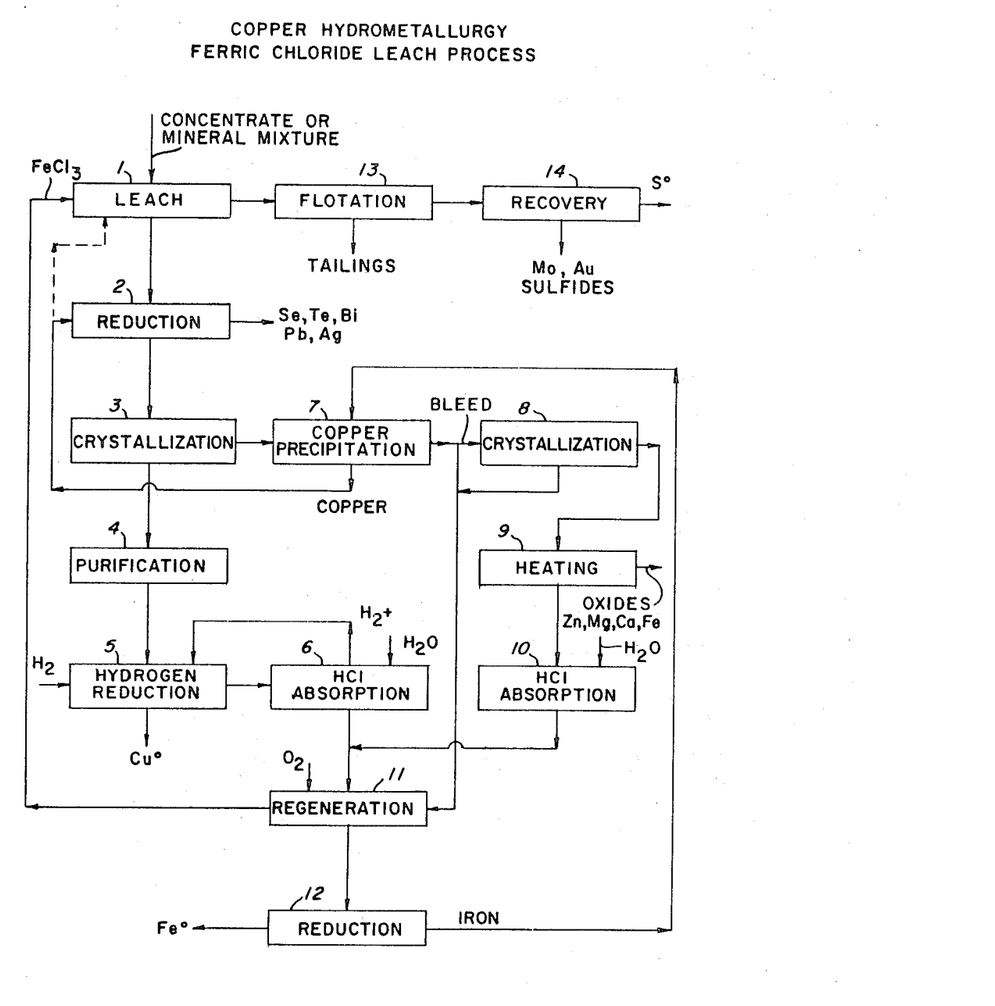

Copper bearing material is fed directly, or after a size reduction, to a leach 1, wherein the material is contacted with a hot ferric chloride containing lixiviant to solubilize copper and iron and to obtain elemental sulfur. Some of the reactions which occur, are illustrated in equations (1) through (5), wherein $x$ may have values between 0 and 1.

$$CuFeS_2 + (4 - x)FeCl_3 \rightarrow xCuCl + (1 - x)CuCl_2 + (5 - x)FeCl_2 + 2S \quad (1)$$

$$(1/5)Cu_5FeS_4 + [(12/5) - x]FeCl_3 \rightarrow xCuCl + (1 - x)CuCl_2 + [(13/5) - x]FeCl_2 + 4S \tag{2}$$

$$CuS + (2 - x)FeCl_3 \rightarrow xCuCl + (1 - x)CuCl_2 + (2 - x)FeCl_2 + S \tag{3}$$

$$(1/2)Cu_2S + (2 - x)FeCl_3 \rightarrow xCuCl + (1 - x)CuCl_2 + (2 - x)FeCl_2 + S \tag{4}$$

$$FeS + 2FeCl_3 \rightarrow 3FeCl_2 + S \tag{5}$$

The copper bearing material reacts with the ferric chloride in the lixiviant and produces a reaction mixture which consists of a leach solution comprising cupric chloride, cuprous chloride, ferrous chloride as well as possible dissolved values of other metals such as zinc, silver, selenium, tellurium, bismuth, lead, tin, nickel, cobalt, and some magnesium, calcium and the alkali metals from feed gangue, and a solid residue comprising elemental sulfur, pyrite, molybdenite, gold, undissolved silver and residual gangue. Arsenic if present in the feed is volatilized as arsenous chloride during the leaching step. It is collected and converted to calcium arsenite.

The ratio of cuprous to cupric ions in the leach solution of the reaction mixture is related to the type of copper bearing material. For example, this ratio is higher for a copper mineral such as bornite than for chalcopyrite. Usually, this ratio of cuprous to cupric ions in the leach solution is about one or lower and seldom rises much above 1.2:1.

The ferric chloride containing lixiviant contains from about 50 to 200 g/l iron as ferric chloride and may also contain some ferrous ion which represents the amount of ferrous chloride which has passed through regeneration without having been oxidized to ferric chloride. The ratio of ferrous to ferric in the lixiviant depends not only on the nature of the copper bearing material, i.e., the content of leachable material, but also on the conditions in the subsequent regeneration of the spent lixiviant, as well as on considerations for obtaining optimum conditions in the subsequent crystallization of cuprous chloride.

The leach is conducted at temperatures slightly below the boiling point of the reaction mixture at atmospheric pressure, thus, the temperature is maintained in the range of from about 80° C to the boiling point of the reaction mixture, while, in order to limit the retention time, the preferred range is from about 95°–100° C. We have found that the retention time of the reaction mixture in the leach varies with the kind of copper bearing material being treated, the particle size of the material and the conditions in the leach. For example, we have found that a received chalcopyrite containing concentrate requires a retention time of from about 9 to 12 hours, while a bornite containing concentrate leaches in a considerably shorter time. In all cases, a suitable retention time will give a recovery of copper and leachable iron in the leach solution in excess of 99 percent.

The leach is performed preferably in counter-current fashion in two or more stages. Each stage comprises agitation of the reaction mixture in a reaction vessel followed by a separation of the liquid fraction from the solids in the reaction mixture discharging from the reaction vessel. If so desired, the solids may be reground prior to feeding to the next stage. The counter-current fashion in which the leach is performed has been shown to give the maximum amount of cuprous chloride as well as, incidentally, the maximum amount of copper in the leach solution. This increased amount of cuprous copper in the solution reduces, correspondingly, the requirement of metallic iron for stripping copper from solution in a subsequent process step.

It is noted that the iron in the leach solution is in the form of ferrous chloride only. Obviously, it is impossible to obtain cuprous copper in the presence of ferric ions and consequently the counter-current leach is designed to eliminate the latter completely. Under the oxidizing conditions which exist in the leach some of the sulfur which is formed will be converted to sulfate ion.

This sulfate is likely to react with dissolved calcium to form a precipitate of gypsum, which is removed in the solid residue of the leach. Thus the sulfate content of the solution may be controlled by the addition of lime or calcium chloride.

The leach solution from the leach 1 is separated from the entrained solids using well known methods such as, for example, settling followed by filtration. The solution should have a copper content of at least 30 g/l copper as both cupric and cuprous ions, while, dependent on the ratio of cuprous to cupric ions, a copper content of 80 g/l is attainable. The leach solution is passed to a reduction 2, wherein the copper which is present in the solution as cupric ions is reduced to the cuprous form. After separation, the final solid residue is washed to recover dissolved copper values and is further treated for recovery of elemental sulfur and sulfides.

In reduction 2, the cupric ions in the leach solution from the leach 1 are reduced to the cuprous state with metallic copper according to reaction equation (6).

$$CuCl_2 + Cu^o \rightarrow 2CuCl \tag{6}$$

The metallic copper used in the reduction should be in finely divided form. We have found that cement copper, such as that which is produced in a subsequent process step, is a convenient form. The amount of metallic copper used in the reduction is about equivalent to the amount of cupric copper present in the solution and, consequently, the amount of copper in solution increases by an amount equal to the original cupric ions content. Usually a small excess of metallic copper is added to remove at least part of the dissolved silver, bismuth, selenium and tellurium from the solution. Any iron which may be present in cement copper will also react with cupric ions with formation of ferrous chloride and cuprous ions. The reduction reactions are exothermic, making possible some removal of water from the system, should this be necessary. The reduction takes place at the boiling point of the solution, i.e., at about 100° C.

The residue from reduction 2 is separated from the reduced solution and may be treated further for the recovery of valuable materials, such as silver, selenium, bismuth, lead and tellurium, etc.

The reduced solution containing an amount of copper in the range of from about 50 to 100 g/l as cuprous ions is fed to a crystallization 3 for recovery of the cuprous chloride. The solution is cooled to a temperature, such as, for example, ambient temperature and cuprous chloride is partly crystallized out of the solution. The cooling of the solution can be effected by using conventional methods such as evaporation under reduced pressure, by heat-exchange with the mother liquor from the crystallization or with cooling water or other suitable medium, or by a combination of these methods by refrigeration. It is understood that product cuprous chloride crystals may be recirculated for the purpose of nucleation.

The solubility of cuprous chloride in the solution is dependent on the temperature and on the concentration of other ions. In the process according to the invention both these variables are controlled, so that a predetermined amount of cuprous chloride precipitates upon cooling, which leaves an amount of copper in solution approximately equal to the amount of metallic copper which is required in the reduction 2. The concentration of other ions in the solution determines not only the solubility of cuprous-chloride but also the rate of the subsequent regeneration of the lixiviant.

The cuprous chloride crystals are separated from the mother liquor by filtration or centrifuging and are washed, with or without repulping, prior to the subsequent purification or prior to the subsequent reduction. The crystals may be further purified, if necessary, in a purification 4, to reduce the impurity content.

The crystals are leached and recrystallized with a suitable solution, such as, for example, a solution containing chlorides or hydrochloric acid. The impurities, such as, for example, iron, magnesium and calcium, are concentrated in the leach residue or in the recrystallization solution depending on the solubility of the individual impurity. The recrystallization through cooling also provides crystals of cuprous chloride of an increased size.

The purified cuprous chloride crystals are separated and reduced in a reduction 5 with hydrogen at elevated temperature. Cuprous chloride is reacted with hydrogen in a suitable reaction vessel to form elemental copper and hydrogen chloride gas, according to equation (7):

$$CuCl + 1/2 H_2 \rightarrow Cu + HCl \tag{7}$$

The cuprous chloride may be fed to the reduction in a variety of forms. The purified crystals from purification 4 may be fed directly to the hydrogen reduction 5, or, alternatively, the crystals may be formed in the shape of prills or briquettes prior to feeding to the reduction.

The reduction reaction is endothermic and may be conducted at atmospheric pressure at a temperature in the range of from about 300° to 500° C.

The metallic copper is recovered from the reaction vessel as final product and may be further processed into a suitable shape or form as required.

The hydrogen chloride gas is removed from the vessel and is recovered from the product gases by forced circulation scrubbing with water in absorption 6. The hydrochloric acid from absorption 6 is obtained in a concentrated form for recirculation to the process. The residual gases from the absorption, which contain unreacted hydrogen, may be returned to the hydrogen reduction 5.

The mother liquor from crystallization 3, after separation from the cuprous chloride crystals, contains from about 15 to 40 g/l copper and is treated in a precipitation 7 to remove the copper content from the liquor by cementation with metallic iron. Cuprous chloride reacts with the iron to form metallic copper and ferrous chloride. The amount of iron used in this cementation is slightly in excess of the theoretical requirement. Because all copper in the mother liquor is present in the cuprous state the quantity of iron consumed in the cementation is low and amounts to less than 0.5 lb. of iron per pound of copper cemented.

The cementation is operated with counter-current flows of solution and solids to ensure complete elimination of copper and to keep the iron content of the precipitated copper as low as possible. The cementation may be performed in at least one agitated vessel and the separation of the liquid and solids is accomplished according to well established methods.

The metallic cement copper which is recovered from the precipitation 7 is used in the reduction 2 wherein cupric ions are reduced to the cuprous state. Excess cement copper, if produced, may be recycled to leach 1 or may be recovered as by-product. If necessary, a special grade of cement copper can be produced in a separate and last agitated vessel. The cement copper recovered from this vessel will contain less noble impurities, such as Pb, Sn, Ni and Co.

The residual solution from the precipitation 7 is substantially free of copper, i.e., contains less than 0.1 g/l copper, and contains a large amount of iron in the range of from about 90 to 300 g/l, as dissolved ferrous chloride, as well as dissolved impurities comprising elements such as zinc, calcium, magnesium and alkali metals. These impurities have not been effected by previous treatments of solution with metallic copper and iron. To maintain the concentration of these impurities at a permissible level it is necessary to bleed off a small portion of the residual solution leaving the precipitation 7. The amount of bleed is determined by the impurity content of the concentrate and the quantity of the impurities in the bleed should be equal to the intake of impurities contained in the concentrate fed to leach 1.

The bleed solution cannot be directly discarded and must be processed to prevent pollution. The processing may be done using one of a number of methods. A suitable method comprises a partial separation of ferrous chloride from the solution followed by a treatment of the remaining solution to recover chlorine values and metal oxides. The separation of ferrous chloride is effected in a crystallization 8 wherein the bleed solution is cooled with or without prior evaporation of excess water, and ferrous chloride is crystallized. The crystallization process is preferably stopped at the point where other chlorides might start precipitating. The ferrous chloride crystals are separated from the mother liquor and are returned to the main process, for example, to the liquid stream from the copper precipitation 7. The mother liquor may then be treated for the recovery of chlorine values. For example, the liquor is treated in step 9, comprising a pickling liquor treatment furnace, whereby hydrogen chloride gas and metal oxides are obtained. The hydrogen chloride gas is recovered in an absorption 10 as hydrochloric acid and the metal oxides, such as the oxides of iron, magnesium, calcium and zinc, are recovered and may be further treated for recovery of values, or may be safely discarded. If so desired, the mother liquor may be treated to recover zinc prior to heating step 9.

The residual solution from precipitation 7, after removing the required amount of bleed solution, is now treated in regeneration 11 to regenerate the ferric chloride containing lixiviant and, simultaneously, to separate the portion of iron present in the solution which is in excess of the amount required in the lixiviant. In regeneration 11 the residual solution from precipitation 7, the ferrous chloride from crystallization 8 and the hydrochloric acid from absorption 6 and absorption 10 are combined and subsequently treated in one or more reaction vessels with an oxygen bearing gas. The ferrous chloride is oxidized to ferric chloride, which is partly hydrolyzed to ferric oxide. A number of reactions may take place depending on the conditions which are maintained in the regeneration process. These reactions are illustrated by reaction equations (8) through (11).

$$6FeCl_2 + 1(1/2)O_2 \rightarrow 4FeCl_3 + Fe_2O_3 \tag{8}$$

$$6FeCl_2 + 1(1/2)O_2 + xH_2O \rightarrow 4FeCl_3 + Fe_2O_3 \cdot xH_2O \tag{9}$$

$$2FeCl_2 + 2HCl + 1/2O_2 \rightarrow 2FeCl_3 + H_2O \tag{10}$$

$$2FeCl_2 + 1/2O_2 + 2H_2O \rightarrow Fe_2O_3 + 4HCl \tag{11}$$

In equation (9) $x$ has a value of approximately one.

The reaction conditions are chosen in such a way that the reactions represented by equations (8) and (10) are promoted, while the reactions represented by equations (9) and (11) are suppressed.

We have found that the regeneration of the ferric chloride lixiviant and the precipitation of the excess iron can be realized at temperatures above 80° C and under pressure of an oxygen bearing gas. We have also found that the reaction rate is a function of both temperature and oxygen partial pressure and that the extent of the oxidation and the filterability of the precipitate are a function of the reaction rate.

In the temperature range of from 80° C to about 135° C the reaction proceeds at increasing rates with oxygen at atmospheric and superatmospheric pressures; however, the precipitated iron product is a hydrated ferric oxide which is extremely difficult to settle filter and wash.

In the temperature range of from about 135° to about 165° C and under a partial pressure of oxygen of up to 150 psi, filterable precipitates are obtained in less than 2 hours, although essentially complete conversions are attained in about 80 minutes. Filterable precipitates are understood to comprise substantially anhydrous ferric oxide.

In the high end of the temperature range, i.e., from about 150° to 165° C, filterable precipitates are obtained in about 20 to 30 minutes while essentially complete conversion requires about 30 minutes.

The ferric oxide precipitated will be precisely the amount required to maintain the correct balance of iron in the process, provided the chloride losses are replaced. Such losses can be made up by addition of calcium chloride to leach 1, of hydrochloric acid to leach 1 or regeneration 11, or chlorine to regeneration 11.

Operating the regeneration at temperatures above 165° C results in the formation of an undesirable amount of hydrochloric acid gas according to reaction equation (11). In the preferred temperature range of from about 135° to 165° C, the small amount of hydrochloric acid which forms will mainly remain dissolved in the regenerated lixiviant. If so desired, this dissolved hydrochloric acid may be freed conveniently in the ferric chloride leach 1 by introducing a small amount of oxygen to this leach.

The ferrous ion content of the feed solution to the regeneration 11 can be as high as the solubility of ferrous chloride will permit. We have found that the feed solution may contain as high as 300 g/l iron as ferrous chloride.

Although the reaction mixture is extremely corrosive, we have found that titanium may be successfully used as a material of constructions, provided that a minimum oxidizing potential is provided in the solution. For example, the presence of a small amount of ferric ion in the solution effectively prevents the corrosion of titanium.

If so desired, additional chlorine may be supplied to replenish any loss of chloride ions which may have occurred by introducing chlorine gas in the reaction vessel of the regeneration, preferably the last vessel if more than one reaction vessel is used. The chlorine rapidly reacts with ferrous chloride to form ferric chloride.

The precipitated ferric oxide is separated from the liquid, washed, dried and reduced to elemental iron in a reduction process 12. The choice of the physical form of the elemental iron and the type of reduction process are determined by the prerequisite of obtaining the highest possible efficiency in copper precipitation 7. We have found that it is possible to use a low temperature reduction process which yields the iron in the form of sponge or powder. A portion of the product iron from reduction 12 is used in the copper precipitation 7, while the remainder is an iron product of a high quality which is particularly suitable for application in high grade steels.

After the separation of the ferric oxide from the reaction mixture, which discharges from regeneration 11, the regenerated liquid is returned as the ferric chloride containing lixiviant to leach 1.

The solid residue from leach 1 is washed, repulped and treated in flotation 13 to separate elemental sulfur and sulfide compounds as a concentrate from the other compounds which report as tailings. The flotation is conducted according to well known methods employing well known reagents. The tailings are discarded and the flotation concentrate is further treated in a recovery 14 wherein the elemental sulfur is separated from the sulfides. This recovery may be accomplished by one of a number of methods known in the art, such as pelletization, solvent extraction, hot filtration and distillation. For example, one convenient method is to heat the concentrate above the melting point of sulfur and to filter off the molten sulfur from the sulfides. The elemental sulfur is solidified in a desired physical form such as prills or blocks. We have found that about 75 to 90 percent of the sulfur converted to the elemental form from the copper bearing materials dependent on the concentrate treated is recovered in this stage. The sulfides may be further treated for the recovery of molybdenum, silver and gold.

EXAMPLE 1

A copper concentrate containing both chalcopyrite and bornite, and analyzing 37.0 percent Cu, 16.5 percent Fe and 23.0 percent S was wet ground to a particle size of 97 percent minus 325 mesh. The ground concentrate was leached with a stoichiometric amount of a lixiviant containing 100 g/l ferric chloride and 50 g/l ferrous chloride at 95° C for 30 minutes.

After separation from the solids residue the solution was found to contain 44 g/l copper for an extraction of 99.97 percent of the copper in the concentrate. The solution did not contain any iron in the ferric state.

EXAMPLE 2

A second amount of the ground concentrate, as used in Example 1, was leached with a stoichiometric amount of lixiviant containing 120 g/l ferric chloride and 20 g/l ferrous chloride at 95° C for 40 minutes. The solution contained 56 g/l copper for an extraction of 99.95 percent of the copper in the concentrate. The solid residue was reslurried with a fresh amount of lixiviant and leached at 95° C for 30 minutes. The remaining solid residue contained only 0.02 percent copper and the overall extraction of copper was 99.98 percent.

EXAMPLE 3

A ferrous chloride solution, comprising ferrous chloride from the copper precipitation with iron, ferrous chloride from the crystallization and hydrochloric acid from the absorption, was treated with oxygen for 2 hours under a pressure of 200 psi at various temperatures in the range of from 60° C to 180° C. The ferrous chloride solution contained 200 g/l iron as ferrous ion, 7.8 g/l calcium, 3.6 g/l magnesium, 12.8 g/l zinc, 16 g/l potassium and 297 g/l chloride as chloride ion. The results are tabulated in Table 1.

From the data in Table I can be seen that above a temperature of 80° C the conversion of iron from the ferrous state to the ferric state proceeded with a high yield of ferric ion. Temperatures up to about 140° C yielded iron oxides with a high water content, i.e., hydrated ferric oxides, which were difficult to separate from the solution. In contrast the iron oxides produced at temperatures from about 140° to 180° C were mainly unhydrated ferric oxide which had a coarse consistency and which was easy to separate from the solution.

EXAMPLE 4

A number of experiments were conducted to determine the quality of the iron oxide precipitate in the regeneration process.

Ferrous chloride containing solutions were subjected to various retention times in the temperature range of from 130° to 160° C under an oxygen partial pressure of 110 psi. The results are shown in Table II.

TABLE II

| Retention time min. | Temperature °C | Conversion $Fe^{++}$ $Fe^{+++}$% | Precipitate |
|---|---|---|---|
| 40 | 130 | 73 | hydrated ferric oxide |
| 80 | | 97.5 | hydrated ferric oxide |
| 120 | | 99.2 | hydrated ferric oxide |
| 20 | 140 | 54 | hydrated ferric oxide |
| 30 | | 67 | hydrated ferric oxide + $Fe_2O_3$ |
| 40 | | 83.5 | hydrated ferric oxide + $Fe_2O_3$ |
| 60 | | 99.7 | hydrated ferric oxide + $Fe_2O_3$ |
| 80 | | 100 | hydrated ferric oxide + $Fe_2O_3$ |
| 120 | | 100 | $Fe_2O_3$ |
| 20 | 150 | 63.5 | hydrated ferric oxide + $Fe_2O_3$ |
| 40 | | 93.5 | $Fe_2O_3$ |
| 60 | | 100 | $Fe_2O_3$ |
| 80 | | 100 | $Fe_2O_3$ |
| 20 | 160 | 81 | $Fe_2O_3$ |
| 30 | | 100 | $Fe_2O_3$ |
| 60 | | 100 | $Fe_2O_3$ |

The data presented in Table II illustrate the relationship between retention time, temperature, the conversion efficiency and the type of iron oxide precipitated and show that substantially complete oxidation to ferric oxide can be obtained in the temperature range of 140° to 160° C with dependent retention times in the range of from 30 to 120 minutes.

All those precipitates which contained hydrated ferric oxide were colloidal in nature and were very slow and difficult in filtering, all those which consisted of ferric oxide were crystalline and easily filterable.

EXAMPLE 5

A copper concentrate high in chalcopyrite, analyzing 28.4 percent Cu, 28.6 percent Fe and 31.2 percent S and with a particle size analysis of 95 percent minus 325 mesh (Tyler Screen Series) was treated according to the process of the invention.

TABLE I

| Temperature, °C | Solution analysis | | Dry weight,* g. | Residue | | | | |
|---|---|---|---|---|---|---|---|---|
| | G./l. $Fe^{++}$ | G./l. $Fe^{+++}$ | | $Fe_2O_3$, percent | $H_2O$ loss,** percent | Color | Consistency | Filtration |
| 60 | 75.0 | 78.5 | 6.34 | 75.8 | 21.8 | Yellow | Fine | Slow. |
| 80 | 6.7 | 121.3 | 9.89 | 78.0 | 20.8 | Brown/red | Coarse | Fast. |
| 110 | 2.5 | 116.0 | 9.74 | 78.0 | 19.6 | do | Fine/voluminous | Slow. |
| 120 | 0.4 | 111.6 | 9.98 | 80.0 | 18.9 | do | do | Do. |
| 140 | 0.4 | 125.6 | 7.02 | 92.5 | 4.4 | Grey | Coarse | Very fast. |
| 160 | 0.3 | 125.2 | 9.14 | 95.0 | 1.8 | do | do | Do. |
| 180 | 0.3 | 120.2 | 10.39 | 96.0 | 1.7 | do | do | Do. |

*After drying at 90° C.
**After heating at 925° C.

The concentrate was leached with a ferric chloride containing lixiviant for 9 hours at 100° C. The solid residue was subjected to flotation and the concentrate was treated for recovery of the elemental sulfur by pelletization. The leach solution from the leach was reduced at 100° C with cement copper.

Cuprous chloride was crystallized by cooling the reduced solution to 20° C. The crystals were recovered, washed and reduced with hydrogen at 420° C.

The mother liquor from the crystallization was treated with iron at the boiling point of the solution. The residual solution, together with the hydrogen chloride recovered from the hydrogen reduction, was treated in an autoclave for the regeneration of the ferric chloride containing lixiviant and the production of ferric oxide at a temperature of 140° C for a period of 120 minutes under a partial pressure of oxygen of 100 psi.

The analyses and quantities of the feed to and the discharges from the various process steps are tabulated in Table III.

From the tabulated figures, the following data were calculated:

The ratio of cuprous to cupric ions in the pregnant solution was 0.47.

The extraction of copper in the chloride leach was 99.5 percent.

About 79 percent of the sulfur in the leach residue was recovered as pure elemental sulfur.

The cement copper produced in this test contained about 5.3 percent iron and was in excess of the requirement for the reduction of cupric chloride.

The analysis of the regenerated lixiviant shows that in the regeneration a suitable lixiviant can be prepared for use in the chloride leach, while the excess iron can be precipitated in an easily filterable form as substantially pure ferric oxide.

The overall copper recovery in this test, including the copper in the excess cement copper, was 97 percent.

EXAMPLE 6

A copper concentrate high in bornite and chalcopyrite, analyzing 38.0 percent Cu, 16.0 percent Fe and 23 percent S and with a particle size analysis of 85 percent minus 325 mesh (Tyler screen series) was leached in two stages with a ferric chloride containing at 95° C for a total retention time of 4 hours.

The solid residue was subjected to flotation and the concentrate was treated for the recovery of the elemental sulfur, using the method of pelletization.

The leach solution was reduced at 100° C with cement copper and cuprous chloride was crystallized by cooling the reduced solution to ambient temperature. The crystals were filtered off, washed and reduced with hydrogen at 400° C. The hydrogen chloride evolved was absorbed in water.

The mother liquor from the crystallization was treated with iron at the boiling point of the solution. The residual solution, together with the hydrogen chloride solution, was treated in an autoclave at a temperature of 150° C for a period of 1 hour under a partial pressure of oxygen of 100 psi.

The analysis and quantities of the feed to and the discharges from the various process steps are tabulated in Table IV.

The data presented in Table IV show that the process according to the invention is suitable for the processing of complex copper-iron sulfides, whereby high quality metallic copper, elemental sulfur and ferric oxide can be obtained in high yields. In actual practice, the whole process can be easily brought in balance by making slight adjustments to the process conditions in the individual process steps.

In this example the cuprous-cupric ions ratio in the leach was 0.96 the overall copper recovery was 98 percent and the recovery of elemental sulfur from the leach residue was 86.5 percent.

What we claim is:

1. A method for recovering copper values from a copper bearing material which comprises the steps of: a) subjecting said copper bearing material to a leach with a lixiviant containing 50 to 200 grams per litre of iron as ferric chloride at a temperature within the range of 80° C up to the boiling point of the reaction mixture, b) separating the reaction mixture thereby formed into a solids residue and a leach solution containing cuprous and cupric and ferrous chlorides, c) reducing the cupric ions in said leach solution to the cuprous state with metallic copper, d) crystallizing cuprous chloride from said leach solution after reduction and separating the cuprous chloride crystals thereby formed, e) treating said cuprous chloride with hydrogen at a temperature between 300° and 500° C to recover elemental copper and, f) treating the ferrous chloride with hydrochloric acid and oxygen to regenerate the ferric chloride containing lixiviant and to simultaneously precipitate ferric oxide.

2. A method according to claim 1 wherein said copper bearing material is a member of the group consisting of chalcopyrite, bornite, covellite, digenite, chalcocite and mixtures thereof.

3. A method according to claim 1 wherein said metallic copper is added in a finely divided form.

4. A method according to claim 1 wherein the leach is carried out at a temperature in the range of from about 95° to 100° C.

5. A method according to claim 1 wherein the amount of metallic copper added in the reduction is at least stoichiometrically equivalent to the amount of cupric ions present in the leach solution.

6. A method according to claim 1 wherein the reduction with metallic copper is carried out at the boiling point of the solution.

7. A method according to claim 1 wherein the crystallization is carried out by cooling the pregnant solution.

8. A method according to claim 1 wherein the separated cuprous chloride cyrstals are subjected to a purification by recrystallization.

9. A method according to claim 1 wherein the ratio of cuprous to cupric ions in the leach solution of the reaction mixture from the leach prior to reduction with copper has values of up to 1.2:1.

10. A method according to claim 1 wherein said treating of said ferrous chloride with hydrochloric acid and oxygen to regenerate the ferric chloride containing lixiviant and to simultaneously precipitate ferric oxide is carried out at a temperature in the range of from about 135° to 165° C, at a partial pressure of oxygen of up to about 150 psi and at a retention time in the range of from about 20 to 120 minutes.

11. A method for recovering copper and sulfur values from a copper and sulfide bearing material which comprises the steps of: a) subjecting said copper and sulfide bearing material to a leach with a lixiviant containing 50 to 200 grams per litre of iron as ferric chloride at a temperature within the range of 80° C up to the boiling point of the reaction mixture, b) separating the reaction mixture thereby formed into a solids residue and a leach solution containing cuprous and cupric and ferrous chlorides, c) treating said solids residue by froth flotation thereby separating elemental sulfur and sulfides present therein from the residual tailings thus formed, d) separating said elemental sulfur from said sulfides and separately recovering the elemental sulfur and said sulfides, e) reducing the cupric ions in the leach solution separated in step b) to the cuprous state with metallic copper, f) crystallizing at least a portion of the cuprous chloride from said leach solution after reduction and separating the cuprous chloride crystals thereby formed, g) treating said cuprous chloride crystals with hydrogen at a temperature between 300° and 500° C to recover elemental copper and, h) treating the ferrous chloride with hydrochloric acid and oxygen to regenerate the ferric chloride containing lixiviant and to simultaneously precipitate ferric oxide.

12. A method according to claim 11 wherein said copper- and sulfide bearing material is a member of the group consisting of chalcopyrite, bornite, covellite, digenite, chalcocite and mixtures thereof.

13. A method according to claim 11 wherein said metallic copper is added in a finely divided form.

14. A method according to claim 11 wherein the leach is carried out at a temperature in the range of from about 95° to 100° C.

15. A method according to claim 11 wherein the amount of metallic copper added in the reduction is at least stoichiometrically equivalent to the amount of cupric ions present in the leach solution.

16. A method according to claim 11 wherein the reduction with metallic copper is carried out at the boiling point of the solution.

17. A method according to claim 11 wherein the crystallization is carried out by cooling the pregnant solution.

18. A method according to claim 11 wherein the separated cuprous chloride crystals are subjected to a purification by recrystallization.

19. A method according to claim 11 wherein the ratio of cuprous to cupric ions in the leach solution of the reaction mixture from the leach prior to reduction with copper has values of up to 1.2:1.

20. A method according to claim 11 wherein said treating of said ferrous chloride with hydrochloric acid and oxygen to regenerate the ferric chloride containing lixiviant and to simultaneously precipitate ferric oxide is carried out at a temperature in the range of from about 135° to 165° C, at a partial pressure of oxygen of up to about 150 psi and at a retention time in the range of from about 20 to 120 minutes.

21. A method of recovering copper, iron and sulfur values from copper, iron and sulfide bearing materials which comprises the steps of: a) subjecting said copper, iron and sulfide bearing material to a leach with a lixiviant containing 50 to 200 grams per litre of iron as ferric chloride at a temperature within the range of 80° C up to the boiling point of the reaction mixture, b) separating the reaction mixture thereby formed into a solids residue and a leach solution containing cuprous and cupric and ferrous chlorides, c) treating said solids residue by froth flotation thereby separating elemental sulfur and sulfides present therein from the residual tailings thus formed, d) separating said elemental sulfur from said sulfides and separately recovering the elemental sulfur and sulfides, e) reducing the cupric ions in the leach solution separated in step b) to the cuprous state with metallic copper, f) crystallizing at least a portion of the cuprous chloride from said leach solution after reduction and separating the cuprous chloride crystals thereby formed, g) treating said cuprous chloride crystals with hydrogen at a temperature between 300° and 500° C to form elemental copper and hydrogen chloride gas, h) treating the mother liquor from crystallization step f) with metallic iron to precipitate its copper content as metallic copper, i) bleeding off a portion of the residual solution after precipitation in an amount to remove a predetermined quantity of impurities from said solution, j) separately recovering ferrous chloride, impurities and hydrogen chloride from said portion, k) reacting hydrogen chloride gas from steps g) and j), the remaining portion of the residual solution after step i) and the recovered ferrous chloride from step j) with oxygen under pressure to thereby regenerate a predetermined amount of ferric chloride containing lixiviant and to simultaneously precipitate the remaining iron content into ferric oxide, and, l) reducing said ferric oxide to metallic iron.

22. A method according to claim 21 wherein said metallic copper precipitated in step h) is recycled to step e) for use in reducing cupric ions to the cuprous state.

23. A method according to claim 21 wherein said ferric chloride regenerated in step k) is recycled for use as the lixiviant of step a).

24. A method according to claim 21 wherein said copper-; copper- and sulfide-; copper-, iron- and sulfide- bearing material is a member of the group consisting of chalcopyrite, bornite, covellite, digenite, chalcocite and mixtures thereof.

25. A method according to claim 21 wherein said metallic copper is added in a finely divided form.

26. A method according to claim 21 wherein the leach is carried out at a temperature in the range of from about 95° to 100° C.

27. A method according to claim 21 wherein the amount of metallic copper added in the reduction is at least stoichiometrically equivalent to the amount of cupric ions present in the leach solution.

28. A method according to claim 21 wherein the reduction with metallic copper is carried out at the boiling point of the solution.

29. A method according to claim 21 wherein the crystallization is carried out by cooling the pregnant solution.

30. A method according to claim 21 wherein the amount of copper in the mother liquor after crystallization of the cuprous chloride is at least equivalent to the amount of copper required in the reduction of the cupric ions.

31. A method according to claim 21 wherein the separated cuprous chloride crystals are subjected to a purification by recrystallization.

32. A method according to claim 21 wherein the regeneration of the ferric chloride containing lixiviant and the simultaneous conversion of the remaining iron content to ferric oxide are carried out at a temperature in the range of from about 135° to 165° C, at a partial pressure of oxygen of up to about 150 psi and at a retention time in the range of from about 20 to 120 minutes.

33. A method according to claim 21 wherein at least a portion of the metallic iron from the ferric oxide reduction is used in the copper precipitation.

34. A method according to claim 21 wherein the ratio of cuprous to cupric ions in the leach solution of the reaction mixture from the leach prior to reduction with copper has values of up to 1.2:1.

* * * * *